F. H. FOLDEN.
MULTIMOLDING TWO SIDE DELIVERY HAND BRICK MACHINE.
APPLICATION FILED MAY 7, 1908.

917,036.

Patented Apr. 6, 1909.

3 SHEETS—SHEET 1.

WITNESSES:

Frank H. Folden INVENTOR,

By Lou. Vaughan,
his ATTORNEY

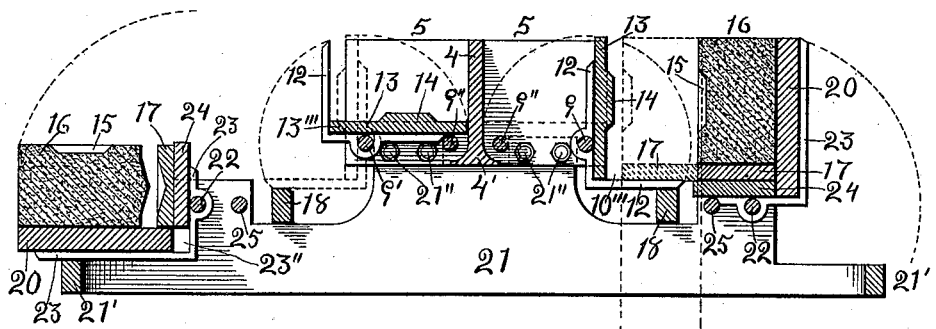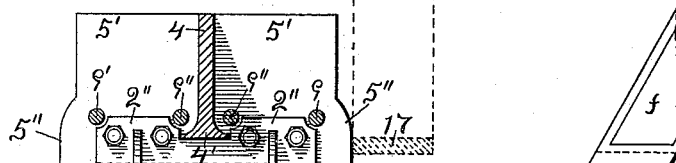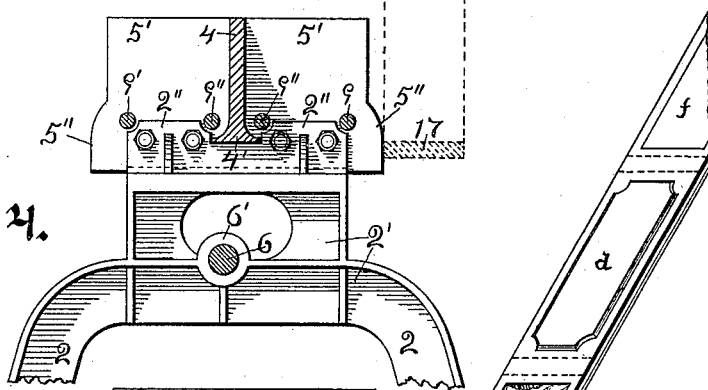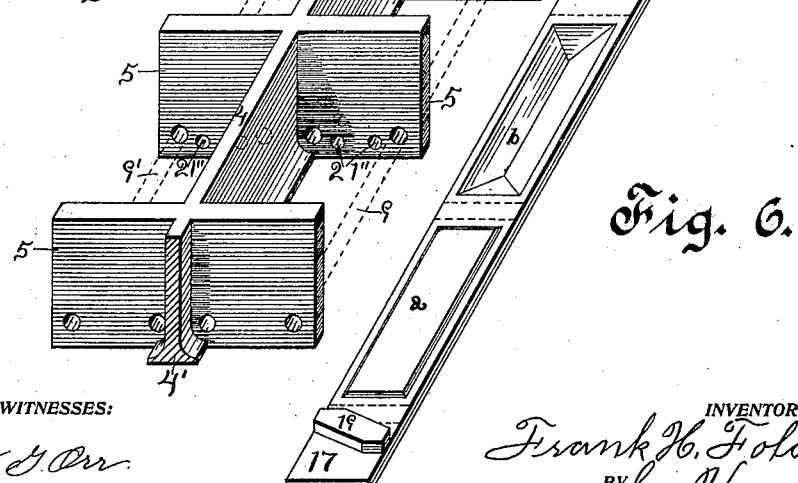

F. H. FOLDEN.
MULTIMOLDING TWO SIDE DELIVERY HAND BRICK MACHINE.
APPLICATION FILED MAY 7, 1908.

917,036.

Patented Apr. 6, 1909.
3 SHEETS—SHEET 3.

WITNESSES:

INVENTOR
Frank H. Folden
BY
ATTORNEY

UNITED STATES PATENT OFFICE.

FRANK H. FOLDEN, OF BLAIR, NEBRASKA.

MULTIMOLDING TWO-SIDE-DELIVERY HAND BRICK-MACHINE.

No. 917,036.　　　　Specification of Letters Patent.　　　　Patented April 6, 1909.

Application filed May 7, 1908. Serial No. 431,510.

*To all whom it may concern:*

Be it known that I, FRANK H. FOLDEN, citizen of the United States, residing at Blair, in the county of Washington and State of Nebraska, have invented certain new and useful Improvements in Multimolding Two - Side - Delivery Hand Brick-Machines, of which the following is a specification.

My invention relates to improvements in brick molding machines in which comparatively large numbers of concrete bricks of a predetermined form and size are molded at one operation; and the objects of my improvement are, first, to provide a machine for the rapid and simultaneous molding of a number of concrete bricks and to facilitate the quick off-bearing of the finished product to leave the machine at once free for the succeeding operation; second, to provide in such a machine means to mold two ornamental faces on each brick or to mold bricks having a sunk-panel bottom bed and an ornamentally molded regular front edge or face; and, third, to provide an efficient economically constructed structure of machine parts and supporting frame to perform other essential functions hereinafter more fully set forth.

I attain these objects by the mechanism illustrated in the accompanying drawing in which—

Figure 1:
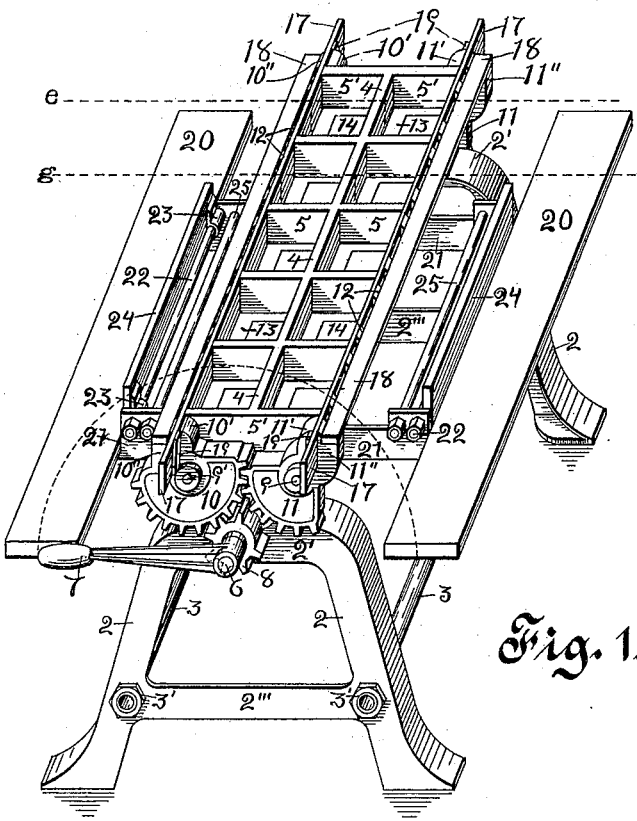
Figure 2:
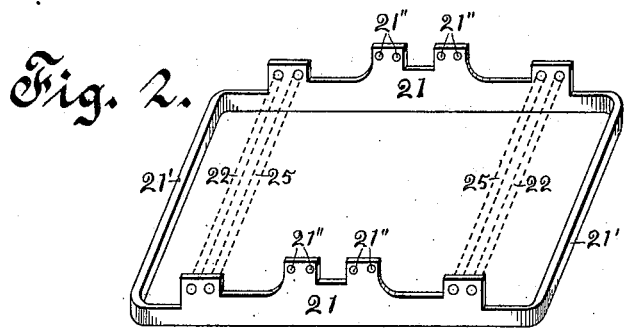
Figure 7:
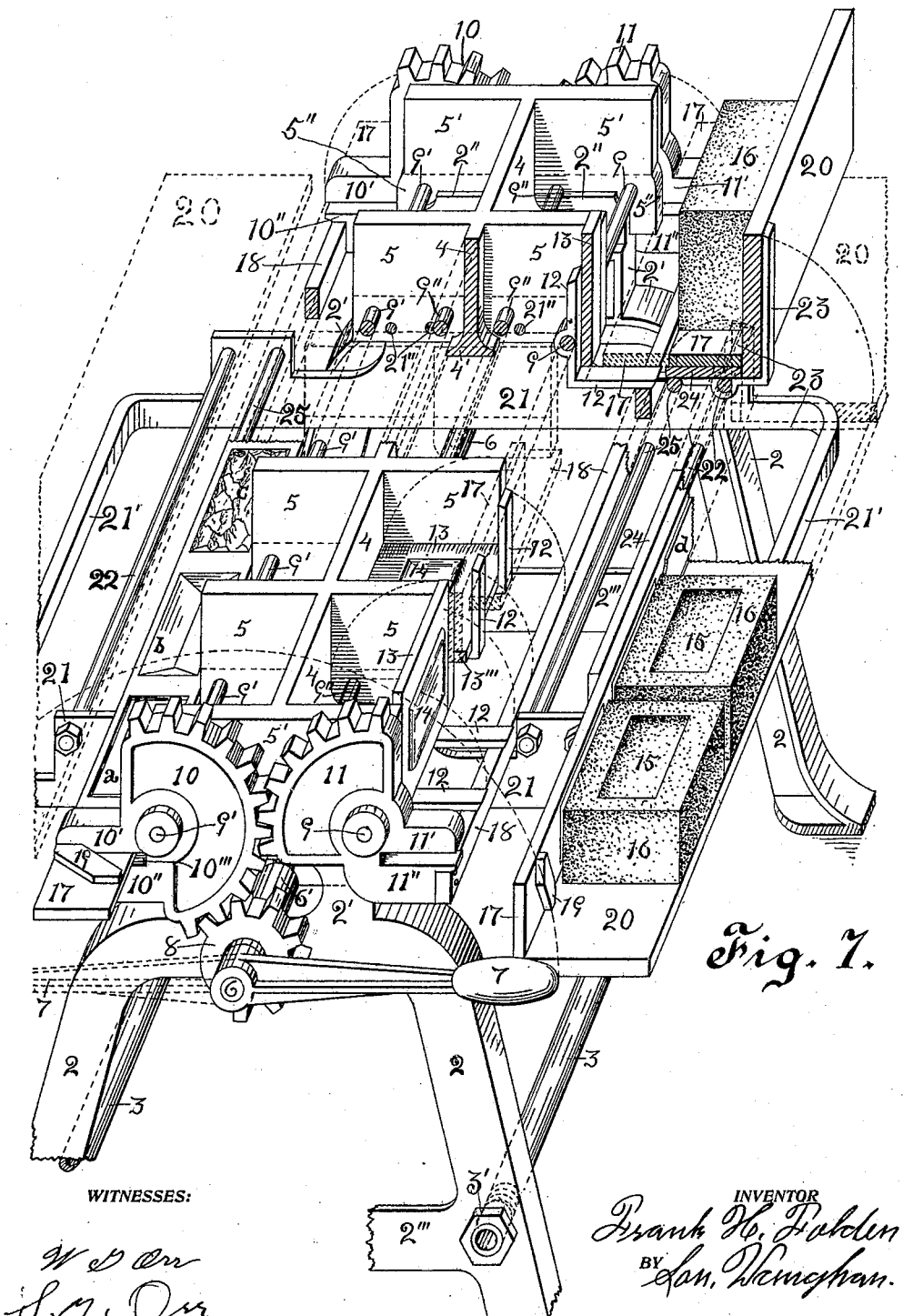

Figure 1 is a perspective view of a whole machine, designed to mold ten bricks—five on each side—at one operation, showing the molds closed ready to be filled with the concrete; Fig. 2, is a perspective view of the rectangular frame 21—21' to strengthen the center of the machine body, to stop and support opening mold-members at the outward limit of their movements, and to provide pivot support for the outwardly-rocking receiving-boards and the off-bearing pallet-boards and to stop and support them at the outward limit of their movements; Fig. 3, is a vertical cross-section, at larger scale, through the second pair of molds from the end, where indicated by the broken line $g$ in Fig. 1; Fig. 4, is a cross-section through the end pair of molds where indicated by the broken line $e$ of Fig. 1, showing an inside elevation of the connected leg-head and end of the body of the machine; Fig. 5, is a perspective view of an end half of the castiron body frame; Fig. 6, is a perspective view of a portion of a removable front or face-plate for molding bricks of various ornamental front edge or face; and, Fig. 7, is a perspective view of the machine showing the molds open and delivering the completed bricks, and parts are removed and a central portion cut away to disclose the construction and movements of the members.

Throughout the several views curved broken lines indicate the sweep of rocking or swinging parts.

Similar numerals refer to like members throughout the different views.

The machine as here illustrated is duplex or double-delivery; molding and throwing out ten completed bricks, five from each of its two longitudinal sides at one operation.

A central longitudinal bar 4 serves as the vertical partition between opposite sides, also as back-plates 4 to the individual flasks or molds; reinforced by widening at its base 4' it becomes a central support or back-bone to the body of the machine. From both sides of this there projects laterally, cross-webs to form the vertical partitions or end-plates 5 between individual molds and the ends 5' and 5' of the whole body; preferably it is all made integral of a single piece of cast-metal. This body is supported at each end by a pair of legs 2 having a head 2' with a flange 2'' fastened to the inside of the lower edge of the end 5', which extends below the other body members to facilitate such fastening. Integral cross - braces 2''' span each pair of legs and opposite pairs are connected by the side pipe-rods 3 threaded at their ends to receive nuts 3' on both sides of said legs.

Through the lower outer corners of the partitions 5 and ends 5' are journaled the longitudinal rock-shafts 9 and 9'. On each end of the rock-shaft 9 there is mounted to rock therewith, a quadrant gear 11. On each end of the rock-shaft 9' there is mounted, to rock therewith, a gear 10 of like diameter to engage with the gear 11, but of longer arc to mesh with a gear-wheel 8 of one-half the diameter, mounted one at each end of a larger driving rock-shaft 6, journaled below in boxes 6' on the leg-heads 2' as shown in Figs. 4 and 7. A lever having a weighted handle-end 7 is rigidly mounted on one end of the driving rock-shaft 6; which weight retains the shafts rocked to the position shown in Fig. 7 with the molds open for delivering the bricks; or by throwing the lever over, a one-half revolution, to the position indicated by the broken lines in Fig. 7 and as shown in Fig. 1, thereby turning the gear-wheels with the rock-shafts above a one-fourth revolution, sets and retains the molds closed for filling.

A pair of L-shaped levers 12 are loosely mounted on the shafts 9 or 9' in each mold. To the inner legs are fastened the swinging bottom-plates 13; shown in Fig. 7 and in Fig. 3. Centrally on the face of the bottom-plates the raised panel-molds 14 are placed to form the sunken bed-panels 15 shown in the completed bricks 16. The longitudinal rods 9'' limit the downward swing of and support the bottom-plates at their inner or swinging edges when the mold is being filled. The outer edge of the bottom-plate projects beyond the outer ends of the partitions 5 as shown at 13''' in Figs. 3 and 7, equal to the thickness of the outside or face-plate 17, the lower edge of which face-plate rests thereon when the molds are closed for filling; as indicated by the broken lines in Fig. 7 and by the space between the vertical leg 12 and the outer end of the adjacent partition 5, in Fig. 3. The outer vertically tilted legs of the L-shaped levers 12 12 etc. bear against the outside of said face-plates where they are retained by the bars 18 and 18, in the position shown in Fig. 1 and indicated by the broken lines in Fig. 7.

The bars 18 and 18 are fastened at their ends to the ends of the outer radial arms 11'' 11'' and 10'' 10'', which are preferably integral parts of the gears 11 and 10, and oscillate therewith. The integral arms 10' and 11' are disposed parallel with and spaced from the arms 10'' and 11'' to form a radially-opening fork on each gear to removably receive and carry the ends of said face-plate as shown in Fig. 1 and in Fig. 7. These face-plates may have different kinds of ornamental panel-molds as shown at $a$, $b$, $c$ and $d$. They are provided at their ends with the inclined lugs 19, 19 etc. which engage the outsides of the arms 10' and 11' to control the face-plates endwise and bring the panel-molds into correct registration with the brick molds. The body ends 5' have base extensions at each end convexly curved to form stationary cams 5'' as shown in Figs. 4 and 7. These cams act against the lower edges of the face-plates 17, when the molds are opening, to start them out from the base of the forks as shown at 10''' in Fig. 3 and in Fig. 7; the resulting position of said face plate is indicated by broken line sections in Figs. 3, 4 and 7. This movement starts and separates the beds of the bricks from the bottom-plates and their panel-molds, which at this stage of the operation—the end of the opening movement—are standing vertical;—see Figs. 3 and 7.

If plain face-edge bricks are being molded, the face-plates 17, with the bricks resting face down thereon, may now serve as pallet boards and be withdrawn from the forks, by grasping their projecting ends, and the bricks thus borne off. But, for molding ornamental-face bricks this would require too many expensive face-plate-pallet-boards with panel-molds. For which reason and to meet other requirements a number of parts are attached and combined as follows: A rectangular frame consisting of the longitudinal side-bars 21' and 21' connected by end-bars 21 and 21, is preferably cast in a single piece as shown in Fig. 2. Vertical extensions at each side of the centers of these ends are fastened to the lower edges of the end partitions of the mold-body. See bolt holes therefor at 21'', 21'' etc. The bars 18 and 18 strike on top of these ends 21 and 21, which serve as stops to limit the opening movements of the molds. A pair of rods 22 and 25 are disposed longitudinally at each side of the machine and their ends fastened through the end-bars 21 and 21 as shown. Near each end of each outer rod 22 an L-shaped bar 23 is mounted as shown, to oscillate thereon;—see Figs. 1, 3 and 7. The pair of L-shaped bars on each rod are connected by the receiving-board or table 24 fastened on top of the short legs of the L-shaped bars between the ends 21; which board and the ends of the legs to which it is fastened strike on the rod 25 to limit its inward and downward swing; and the rods are disposed in height to bring the top of the receiving-board level with the outer or under side of the face-plate, as indicated in broken-line-section at 17 in Figs. 3 and 7, when the molds are open. From this position the face-plate with the molded bricks thereon may be drawn laterally out of the forks to the position shown on the receiving-board 24, bringing its top edge and the top bed of the brick 16 against the vertical pallet board 20. This pallet board is removably supported in angular relation to said receiving-board by the L-shaped bars 23. The whole may now be tilted outward to the position indicated by the broken lines 23 in Fig. 7 or as shown below by the face-plate 17, and pallet board 20 with finished bricks 16 16 thereon; also a like position is shown in cross-section on the opposite side of the machine at 20 and 16 in Fig. 3.

The outer legs of the L-shaped bars 23, 23 etc. strike on the side-bars 21' and 21', as shown in Figs. 3 and 7, to limit the swing and support the pallet board 20 horizontally. The back or lower edge of the outwardly tilted pallet board strikes the outer edge of the raised portions of the end-bars 21 and 21, through which the rods 22 and 25 are fastened, and force it, with the imposed finished bricks, slightly away from the mold-face of the face-plate, as shown in broken lines 23 in Fig. 7, at 23'' in Fig. 3 and by the positions of the finished bricks 16, 16 and 16 in these views. As the pallet board is raised and drawn laterally away to bear off the finished bricks, the face-plate falls away from them to be replaced in the forks and the molds closed for the next filling.

When the machine is assembled and closed for filling, the outer vertically disposed legs of the L-shaped levers 12, 12 etc. are disposed between the face or front-plates 17 17 and the bars 18, 18,—see Fig. 7, and Fig. 1, and therefore with the attached bottom-plates 13 must swing with the rocking of the rock-shafts 9 and 9'. But when the machine is open and the front-plates removed then each bottom-plate with its attached L-shaped levers may be swung independently for cleaning or repairs. Driving the rock-shaft gears at both ends of the machine by the smaller gear-wheels 8 mounted at the ends of a heavy longitudinal driving-shaft 6, I am enabled to use lighter rock-shafts 9 and 9' without torsional springing, have a greater purchase to operate the molds and bring the weighted lever into the most effectual position to retain the molds open or closed and being central, most out of the way during other parts of the operation of molding and delivering. Different shapes and smaller sizes of bricks can be molded by attaching counterparts of the desired forms to either the bottom-plates or face-plates as required.

I claim:

1. The combination of end-plates and a back-plate in fixed angular relation, a bottom-plate pivoted to swing between said end-plates, a slidably-removable front-plate, guides to carry said front-plate in fixed angular relation to said pivoted bottom-plate and to swing said front-plate against or away from the front ends of said end-plates, a pivoted receiving-board disposed to receive said slidably-removable front-plate, a removable pallet board, and a support in fixed angular relation to said pivoted receiving-board to carry said removable pallet board.

2. The combination of end-plates and a back-plate in fixed angular relation, a bottom-plate pivoted to swing between said end-plates, guides connected to carry a removable front-plate in rigid angular relation to said bottom-plate, a removable front-plate adapted to be slidably disposed in said guides to swing thereby against the front ends of said end-plates, eccentric projections on said end-plates to engage the outwardly-swinging front-plate to slide it away from said bottom-plate.

3. The combination of end-plates and a back-plate in fixed angular relation, a bottom-plate pivoted to swing flatwise between said end-plates, a slidably-removable front-plate, guides to carry said front-plate in fixed angular relation to said swinging bottom-plate, stationary cams to engage the outwardly swinging front-plate and slide it away from said bottom-plate, a tilting table to receive the outwardly sliding front-plate, a removable pallet board, and a support in fixed angular relation to said tilting table to carry said removable pallet board.

4. A construction for multi-molding two-side-delivery brick machines, comprising a flat bar reinforced by an integral longitudinal thickened portion to form back-plates for and a partition between opposite side rows of molds and to serve as a longitudinal central support to the machine, integral laterally projecting cross-webs on both sides at the ends of said central bar to serve as ends of the machine body and form plates to the end molds, supporting legs attached to said body ends, intermediate laterally projecting integral cross-webs on both sides of said central bar to serve as partition plates between said molds and a frame consisting of longitudinal side-bars and cross end-bars suspended centrally beneath said longitudinal support and fastened thereto.

5. The combination of a double faced back-plate having laterally projecting partition-plates on both faces, rock-shafts disposed near the outer ends of the partition-plates, bottom-plates mounted on said rock-shafts, gear wheels mounted on said rock-shafts to connect and rock them in opposite directions, removable front-plates, radial forks mounted on said rock-shafts to releasably engage said front-plates to close them against the ends of said partition-plates or swing them outwardly, detents to limit the movements and support the plates horizontally, and means to turn said rock-shafts.

6. The combination of a back-plate and partition-plates in fixed angular relation, a rock-shaft disposed near the front ends of said partition-plates, a bottom-plate mounted loosely on said rock-shaft to swing flatwise between said partition-plates, radial forks mounted rigidly on the ends of said rock-shaft, a front-plate having ends adapted to be removably seated in said forks, a bar fastened to the ends of the outer branches of said forks, and bent arms on said bottom-plate to engage between said bar and said front-plate.

7. A multi-molding two-side-delivery brick machine, having in combination, a longitudinal central bar to form a partition between and back-plates for opposite side rows of molds, lateral projections on said central bar to form partition-plates between the molds, a rock-shaft disposed parallelly with each row of molds, gear wheels mounted on said rock-shafts to connect and rock them in opposite directions, bottom-plates mounted on the rock-shafts, a front-plate for each row of molds, radial forks mounted on said rock-shafts to releasably carry said front-plates, stationary cams to slide the outwardly swinging front-plates away from said bottom-plates, means to limit the movements and support the plates in desired positions, and a weighted operating lever connected to turn said rock-shafts and retain the molds opened or closed.

8. In a multi-molding two-side-delivery brick machine, the combination of a double faced back-plate disposed between opposite side rows of molds, cross-webs projecting from the faces of said back-plate to form partition-plates between individual molds, a longitudinal rock-shaft for each row of molds, bottom-plates mounted on said rock-shafts, gear wheels to connect said rock-shafts, a continuous front-plate for each row of molds, radial forks mounted on said rock-shafts to removably receive and carry said front-plates, stationary cams to engage the outwardly swinging front-plates and slide them away from said bottom-plates, rocking-tables to receive said removable front-plates, and removable pallet boards supported angularly on said rocking-tables.

9. In a multi-molding two-side-delivery brick machine, the combination of a double faced back-plate, a row of partition-plates projecting from each face of said back-plate, a rock-shaft disposed parallelly with each row of partition-plates, bottom-plates mounted on said rock-shafts, gear wheels to connect said rock-shafts, a front-plate for each row of partition-plates, radial forks mounted on said rock-shafts to releasably engage and actuate said front-plates, and a driving-shaft connected to actuate said gear wheels.

10. In a multi-molding two-side-delivery hand brick machine, the combination of a double faced back-plate having projections to form oppositely opening rows of molds, a rock-shaft disposed parallelly with each row of molds, gears to connect said rock-shafts, bottom-plates mounted loosely on said rock-shafts, a front-plate for each row of molds, radial forks rigidly mounted on said rock-shafts to releasably carry said front-plates, bars attached to the outer branches of said forks, arms on said bottom-plates to engage between said bars and said front-plates, stationary cams to engage and slide the outwardly swinging front-plates away from said bottom-plates, rocking-tables to receive the outwardly sliding front-plates and having angularly disposed arms to carry removable pallet boards, a driving rock-shaft connected to drive said gears, and a weighted hand-lever mounted on said driving rock-shaft.

In testimony whereof I affix my signature in presence of two witnesses.

FRANK H. FOLDEN.

Witnesses:
  E. P. DERAND,
  S. E. KEMP.